United States Patent [19]

Westdijk

[11] Patent Number: 5,073,953
[45] Date of Patent: Dec. 17, 1991

[54] SYSTEM AND METHOD FOR AUTOMATIC DOCUMENT SEGMENTATION

[75] Inventor: Jacob A. Westdijk, Venlo, Netherlands

[73] Assignee: OCE Nederland B.V., Netherlands

[21] Appl. No.: 403,195

[22] Filed: Sep. 1, 1989

[30] Foreign Application Priority Data

Sep. 12, 1988 [EP] European Pat. Off. ............ 88201987

[51] Int. Cl.⁵ .............................................. G06K 9/34
[52] U.S. Cl. .......................................... 382/9; 382/51; 382/48; 358/462
[58] Field of Search ............... 382/9, 51, 48; 358/462, 358/457, 453

[56] References Cited

U.S. PATENT DOCUMENTS

| | | | |
|---|---|---|---|
| 4,503,556 | 4/1985 | Scherl et al. | 382/9 |
| 4,656,665 | 3/1987 | Pennebaker | 382/51 |
| 4,741,046 | 3/1988 | Matsunawa et al. | 382/9 |
| 4,750,209 | 6/1988 | Shimura et al. | 382/9 |
| 4,856,075 | 8/1989 | Smith | 382/50 |

FOREIGN PATENT DOCUMENTS 0100811 2/1984 European Pat. Off. .
0202425 11/1986 European Pat. Off. .

Primary Examiner—Leo H. Boudreau
Assistant Examiner—Barry Stellrecht
Attorney, Agent, or Firm—Reed Smith Shaw & McClay

[57] ABSTRACT

In a system and method for automatically segmenting a scanned document to separate areas containing different types of information such as black/white text or graphics, continuous tone pictures, and half-tone pictures, the document is divided into a number of subimages and the individual subimages are classified in an initial labeling phase. The initial label matrix thus obtained is relaxed in a subsequent step so that a pattern of uniformly labeled segments corresponding to the areas in the document containing different types of information is the result. In order to speed-up the system and/or improve the robustness thereof, the number of initial labels used in the initial labeling step is selected larger than the number of types of information to be distinguished. The number of initial labels is then reduced in the relaxation step on the basis of a series of context rules.

6 Claims, 5 Drawing Sheets

SYSTEM AND METHOD FOR AUTOMATIC DOCUMENT SEGMENTATION

FIELD OF THE INVENTION

The present invention relates to a system and method used in an electronic document processing device to automatically separate a scanned image of a document into segments, each segment containing different types of information such as text and line drawings, continuous tone pictures, or half-tone pictures.

BACKGROUND OF THE INVENTION

A document to be processed in an electronic document processing device such as an electronic copier, an optical character recognition system, or a data compression system, may be comprised of different types of information. These different types of information must be processed in different ways to achieve acceptable copy quality or sufficient data compression, or to enable image manipulation. For example, a document may consist of black and white information such as text or line drawings, continuous tone photographs, and raster or dithered images known as half-tones. When the data collected by scanning such a document undergo processing, storage, or printing, the information representing text or line drawings is usually thresholded to create a binary image, while raster or dithered information is grey-scale thresholded, and continuous tone information is dithered. Consequently, it is necessary to identify each portion of the document containing a particular type of information. This process is termed "segmentation."

An automatic segmentation system has two requirements. First, the system must be fast enough to process documents at high speed. Second, the system must be sufficiently robust to handle documents which have printing that is difficult to distinguish, such as brightly colored text on a dark background or photographs containing large bright areas.

Some automatic segmentation systems consist of a single labeling step. For example, U.S. Pat. No. 4,741,046 discloses a system which measures the variation in the number of foreground pixels constituting foreground pixel regions and the density of those pixels to label segments of a scanned image. Single-step processes can be fast but often lack robustness.

To improve robustness, a two-step labeling system can be used. An example of a conventional two-step automatic segmentation system capable of separating text information from half-tone information is disclosed in the European Patent Application No. 0 202 425. In that system, the scanned image of the document is divided into a matrix of subimages four pixels by four pixels in size. Each of these subimages is initially labeled either as TEXT or as an IMAGE according to the intensity of the pixels within the subimage. Because the labeling of comparatively small subimages is subject to statistical fluctuations, the resulting matrix of labeled subimages frequently includes short strings of TEXT-labeled subimages where IMAGE-labeled subimages are predominant, and vice versa. In the final step of the segmentation process, the relaxation step, a context rule is applied to the matrix, which switches the labels of isolated subimages or short runs of subimages to the predominant label in the surrounding environment.

Similar systems have been disclosed, such as in European Patent Application No. 0 100 811 and French Patent Application No. 2,508,747, but are disadvantageous because the labels used in the initial labeling step and the context rules used in the relaxation step require a large number of criteria, which means increased processing time if the systems are to be robust.

It would be desirable, therefore, to develop an automatic document segmentation system which improves both robustness and speed of processing.

SUMMARY OF THE INVENTION

Generally, the present invention relates to a method and system for automatically segmenting a scanned image of a document by initially labeling subimages with a wider variety of less certain more descriptive labels and using a richer or more comprehensive set of context rules during the relaxation step to determine the final label of each subimage. Preferably the method of the present invention for automatically segmenting a scanned document in an electronic document processing device to separate document areas containing different types of image information comprises the steps of: (a) scanning the document to generate a scanned image thereof; (b) subdividing the scanned image into a matrix of subimages; (c) analyzing the information contained in each subimage and assigning to each subimage an initial label selected from a first set of labels to obtain an initial label matrix; and (d) relaxing the initial label matrix by changing the labels of individual matrix subimages into relaxed labels which are selected from a second set of labels which is smaller in number than said first set pursuant to a plurality of context rules to obtain a pattern of uniformly labeled segments representing those document areas containing different types of information.

The system of the present invention is preferably used in an electronic document processing device to automatically separate a scanned image of a document into a plurality of segments each containing a different type of information, the system comprises: (a) a means for subdividing the scanned image of the document into a matrix of subimages each containing information; (b) a labeling module for analyzing the information contained in each subimage and assigning to each subimage an initial label from a set of possible label types, thereby creating an initial label matrix; an (c) a relaxation module for relaxing the initial label matrix by changing the initial labels into relaxed labels, pursuant to a plurality of context rules, to obtain the segments representing the different types of information in the scanned image, the relaxed labels being selected from a second set of possible label types which is smaller in number than the first set.

With the system of the present invention, the number of different labels which can be selected in the initial labeling step is larger than the number of different types of information which finally have to be distinguished. Because the initial labels of the subimages are more descriptive, it is not necessary to identify the type of information within the blocks with certainty. Thus, the initial labeling step can be accomplished quickly, even when the size of the subimages is chosen to be comparatively large in order to reduce statistical fluctuations.

The types of information represented by the initial labels is finally determined in the relaxation step on the basis of context rules. Suitable context rules do not require much calculation time, which means the overall processing time is faster than with previous systems.

In addition, because the initial labels provide a more descriptive classification of subimages, certain types of errors that have occurred in the initial labeling step can be corrected in the relaxation step even when these errors apply to comparatively large runs of subimages. This makes the present system more robust.

Other advantages of the present system will become apparent from the following detailed description and accompanying drawings of a presently preferred embodiment thereof.

DESCRIPTION OF THE PREFERRED EMBODIMENTS

Figure 1:
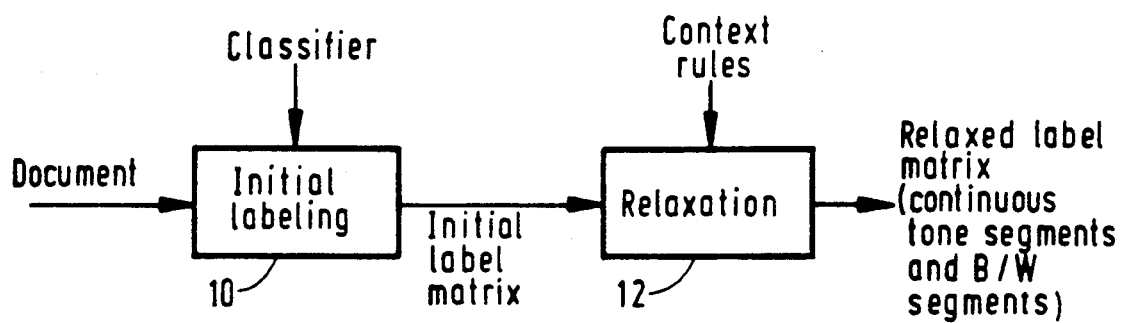
FIG. 1 is a block diagram illustrating the basic elements of an automatic segmentation system.

As shown in FIG. 1, the present document segmentation system is comprised of an initial labeling module 10 and a relaxation module 12. A signal representing the scanned image of the whole document is transmitted from a document scanner (not shown) to the initial labeling module 10. The information from the scanned image is treated as a matrix of subimages. For example, an A4 document might be scanned with a resolution of 500 dpi, and a subimage size of 64×64 pixels. The grey level of each pixel would be represented by an eight-bit word corresponding to one of 256 possible grey levels.

In the initial labeling module 10, each individual subimage is analyzed by using a classifier consisting of a number of routines for extracting characteristic features from the subimage. On the basis of the extracted features, an initial label is assigned to the subimage. The result of this process is an initial matrix of labeled subimages which represents the whole document.

The initial label matrix (of subimages) is then processed in the relaxation module 12. Relaxation module 12 uses a plurality of context rules and the labels assigned to neighboring subimages to change the appropriate initial subimage labels. The context rules are designed so that some of the initial label types are eliminated completely by the relaxation process. The result is a relaxed matrix of labeled subimages which preferably consists of only two types of labels designating segments as either continuous tone segments, or text and line drawing segments.

Figure 2:
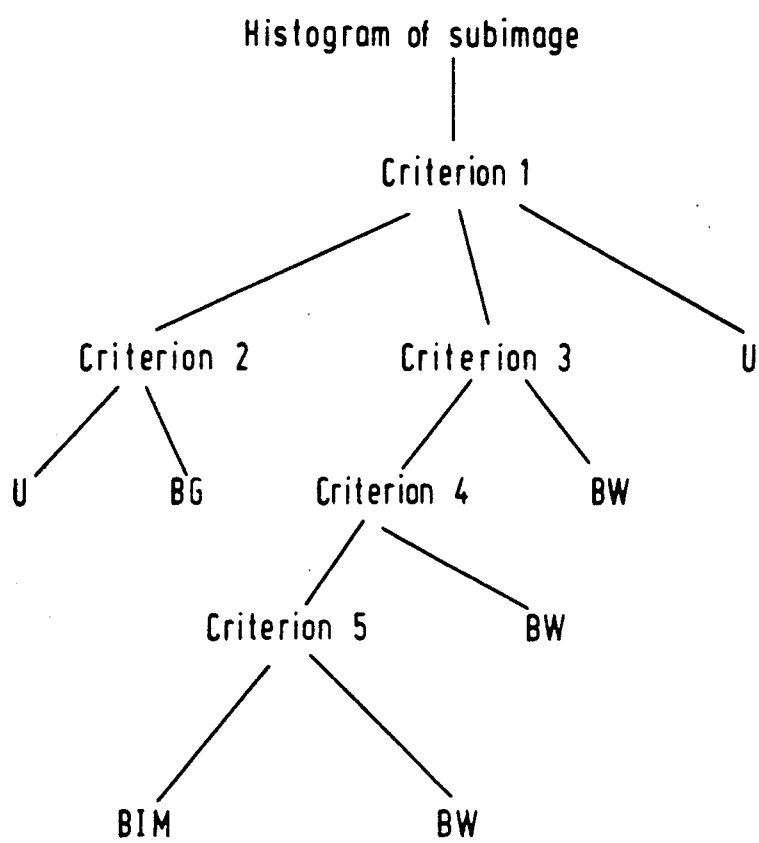
FIG. 2 illustrates a branch classification process that can be used in the initial labeling means.

The classifier used in the initial labeling module may be based on conventional methods of image analysis, such as histogram evaluation, spacial analysis, differential operators, spectral analysis, or a combination of these methods. The classifier may be a tree-classifier in which the check routines to be applied are respectively dependent on the result of the preceding check, or alternatively a one-shot classifier may be used. As preferred in one embodiment, FIG. 2 illustrates a tree-classifier which evaluates a grey level histogram of the subimage. Each branching point of the tree diagram shown in FIG. 2 corresponds to a specific criterion for which the histogram data are checked. For example, the following criteria might be used:

(1) the position of the highest peak of the histogram on the abscissa, i.e., the grey level which occurs most frequently (this criterion indicates the overall brightness of the subimage);

(2) the number of peaks of the histogram (a histogram having two distinct peaks is a hint that the subimage consists of text or line drawings);

(3) the height difference between two peaks (most text or line drawing subimages have a large height difference between the highest and the second highest peak);

(4) the grey level difference between two peaks (in black/white images, this difference will be large);

(5) the height of the minimum level between two dominant peaks (in a continuous tone image, this level will be high);

(6) the height differences between the highest peak and the minimum levels on one or both sides thereof, as a kind of "signal to noise distance";

(7) the number of pixels below the minimum level of the valley between the two main peaks (this number will be high in half-tone subimages); and (8) the widths of the highest peak or the two highest peaks (narrow peaks may be an indication of text or line drawings).

When the criteria used in the classifier have a wide range of possible results, the results are thresholded to obtain a practical number of branches. The structure of the tree, the criteria employed therein, and the threshold values may be optimized by matching them to statistical results obtained from a number of gauge documents. The broader the variety of gauge documents, the greater the robustness but also the increased complexity of the classifier.

In the tree-classifier shown in FIG. 2, there are four different labels, BW, BIM, BG and U, by which subimages may be classified. The four labels designate the following characteristics:

BW—Two dominating grey levels with a high contrast; a candidate for text or line drawing (BW stands for black/white);

BIM—An image which has two dominant grey levels, but is not a strong candidate for text or line drawing in view of other criteria (BIM stands for "bimodal");

BG—A typical background area; comparatively bright and with low contrast; may occur in text or graphic segments but as well in half-tone segments; and U—An area with a diffuse grey level distribution (U stands for "undefined"); a candidate for continuous tone images.

Figures 4A, 4B:
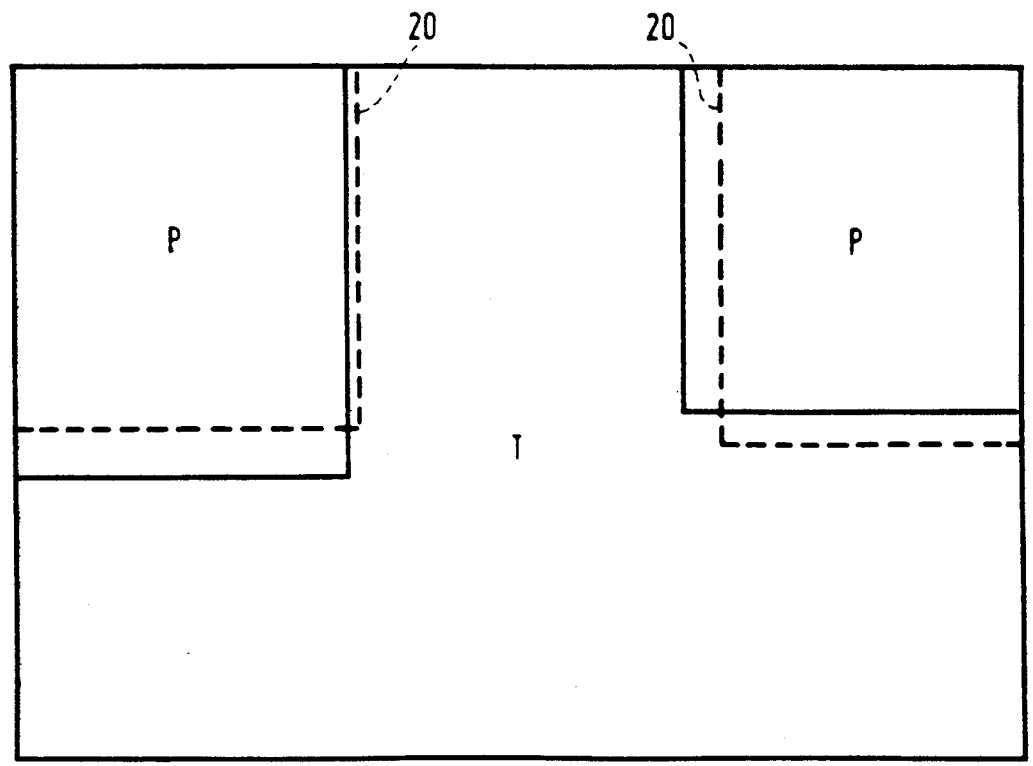
FIG. 4(A) is an example of an initial label matrix and FIG. 4(B) is the resulting relaxed label matrix.

An example of an initial label matrix which might result from applying the above-described classifier is illustrated in FIG. 4(A). This initial label matrix still includes a number of fluctuations which must be eliminated in the relaxation step using context rules and the labels of neighboring subimages.

FIGS. 3(A) through 3(E) show 5 examples of different context rules being applied to subimages. In order to compare the subimages to their respective neighbors, the subimages are combined into three by three arrays A or A'. The four context rules illustrated in FIGS. 3(A) to 3(D) are applied to the individual three by three arrays.

Figure 3A:
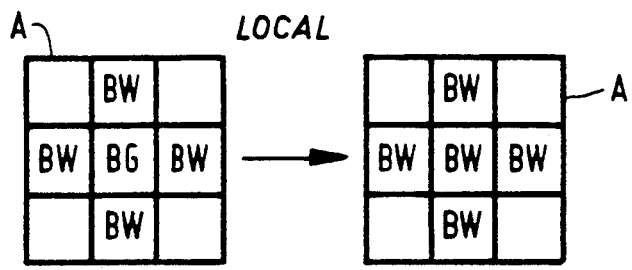
FIG. 3(A) through 3(E) illustrate the operation of context rules on subimages in the relaxation means.

A "LOCAL" context rule, illustrated in FIG. 3(A), eliminates isolated labels in a homogeneous environment. This rule may be stated as:

If a label X is surrounded by upper, lower, right and left neighbors having the label Y, then change X to Y.

In the LOCAL rule, X and Y can be any of the initial labels BW, BIM, BG, U.

Figure 3B:
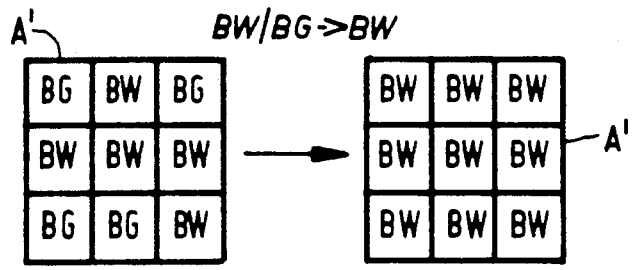
Figure 3C:
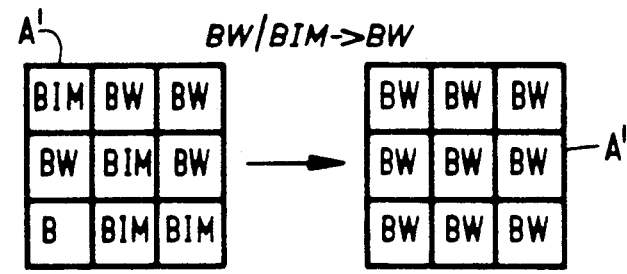

The context rules illustrated in FIGS. 3(B) and 3(C) may be called "weak expansion" rules and have the following formula:

If at least one subimage in a three by three array A' has the label BW and the array does not contain labels from a predetermined group, then expand the label BW over the whole array.

The expansion rule shown in FIG. 3(B) converts combinations of BW and BG to BW; the rule may be written succinctly as BW/BG→BW. In this rule, the "predetermined group" of labels which must not be contained in the array consists of the labels BIM and U. If any of these labels is contained in the array, the array is left unchanged by this context rule.

In FIG. 3(C), the "predetermined group" of forbidden labels consists of the labels BG and U. This context rule converts only arrays which consist of combinations of BW and BIM and the rule may be written as BW/BIM→BW.

It is possible to establish other context rules with the same structure by defining other groups of labels which must not be contained in the array. For example, it is possible to convert the whole array to BW in one step when the array consists of a combination of BW, BG, and BIM. These example context rules may be further modified by requiring that the array contain at least two, three, or more subimages having the label BW.

Figure 3D:
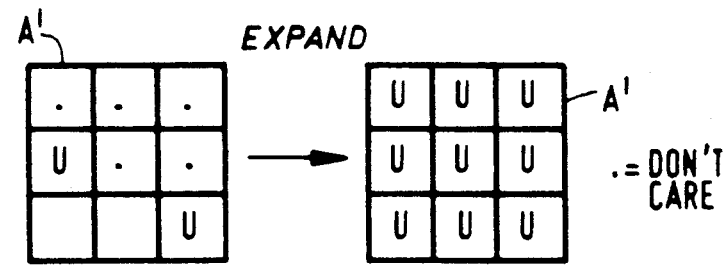

A context rule EXPAND illustrated in FIG. 3(D) prescribes that:

If the array A' includes at least one subimage with the label U, the label U is expanded over the whole array.

In this rule, there is no restriction as to the other labels appearing in the initial array.

Figure 3E:
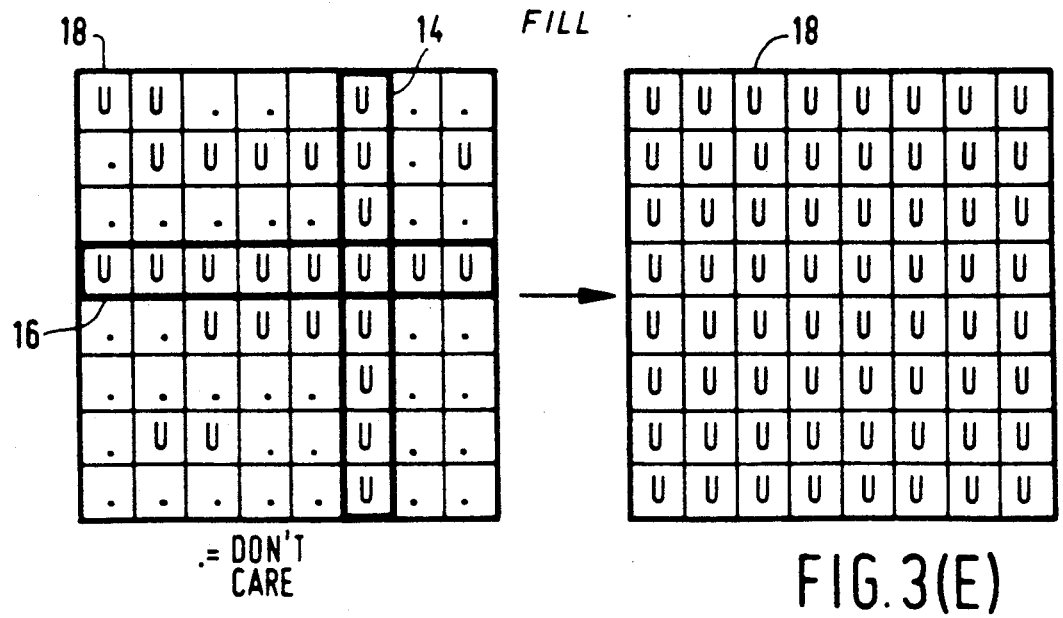

FIG. 3(E) illustrates a context rule FILL, which is not constrained to the three by three arrays. This rule can be defined as follows:

1) Where the label U forms intersecting vertical and horizontal runs 14 and 16, fill the whole rectangle 18 spanned by these runs with the label U (the term "run" designates a non-interrupted sequence of labels U in a row or a column of the matrix);
2) Check all combinations of horizontal and vertical runs to maximize the area filled with U;
3) If the height of the maximized area is smaller than four subimages or the width thereof is smaller than four subimages, then change all labels of this area to BW.

As an extension to the context rule FILL, the spanned rectangles are only filled with the label U if they contain a number of U labels greater than a predefined ration (Umin/U) and/or the shape of the rectangle is bound to certain conditions, for example greater than a predefined minimum or smaller than a predefined maximum.

The relaxation module 12 preferably operates to apply the context rules illustrated in FIG. 3 in the following sequence.

| | |
|---|---|
| (1) LOCAL | (6) BW/BG→ BW |
| (2) BW/BG→ BW | (7) LOCAL |

-continued

| | |
|---|---|
| (3) LOCAL | (8) EXPAND |
| (4) BW/BIM→ BW | (9) LOCAL |
| (5) LOCAL | (10) FILL |

In each of these steps, the context rule is applied to the whole matrix before the next step is executed. In the case of the context rule LOCAL, the whole matrix is scanned with a three by three window in steps of one subimage so that each subimage is the central subimage of a three by three array A. In steps (2), (4), and (6), the same procedure may be applied. Alternatively, the matrix may be divided into a rigid grid of three by three arrays A'. In step (8), a rigid grid of three by three arrays A' is used. Alternatively, the floating array method may be adopted, but then the context rule should require that each array includes at least two labels U, since otherwise, the expanded area would become too large.

Step (1) starts with the initial label matrix generated by initial labeling module 10. All other steps are executed on the modified matrix which is a result of the preceding step. The LOCAL rule is executed several times, interleaved with the other context rules. The rule BW/BG→BW is applied in step (2) and is applied once again in step (6). At the end of step (7), the labels BG and BIM are eliminated to a large extent, and the matrix shows areas which are homogenously filled with the label BW, while other areas contain the label U in combination with other labels. In these areas, the label U is expanded in steps (8) and (10), so that at the end of step (10) the whole matrix is composed of rectangular areas homogenously filled with either BW or U. However, the rule FILL prescribes that areas filled with U are converted to BW, if they are too small.

Thus, the label matrix obtained at the end of step (10) consists only of the labels BW and U which form large rectangular segments representing text and line drawing areas and continuous tone areas, respectively, of the scanned document. This is the desired relaxed label matrix, but to distinguish this matrix from an initial label matrix, the labels BW and U are renamed relaxed labels T (for "TEXT") and P (for "PHOTO"), respectively.

FIG. 4(B) illustrates the relaxed label matrix obtained from the initial label matrix shown in FIG. 4(A). These Figures reflect experimental results obtained by applying the above-described segmentation process to a test document which included a text area with several text formats and two photographic areas. The actual borders of the photographic areas of the document are indicated by dashed lines 20. The P-segments in FIG. 4(B) match the actual borders of the photographic areas to within the resolution of the matrix of subimages.

As is shown in FIG. 4(A), the photographic areas include comparatively large coherent areas filled with the labels BW, BIM, and BG, which could have been interpreted as text areas. In the relaxation process, these ambiguities have been removed successfully by using the context rules.

Figure 5:
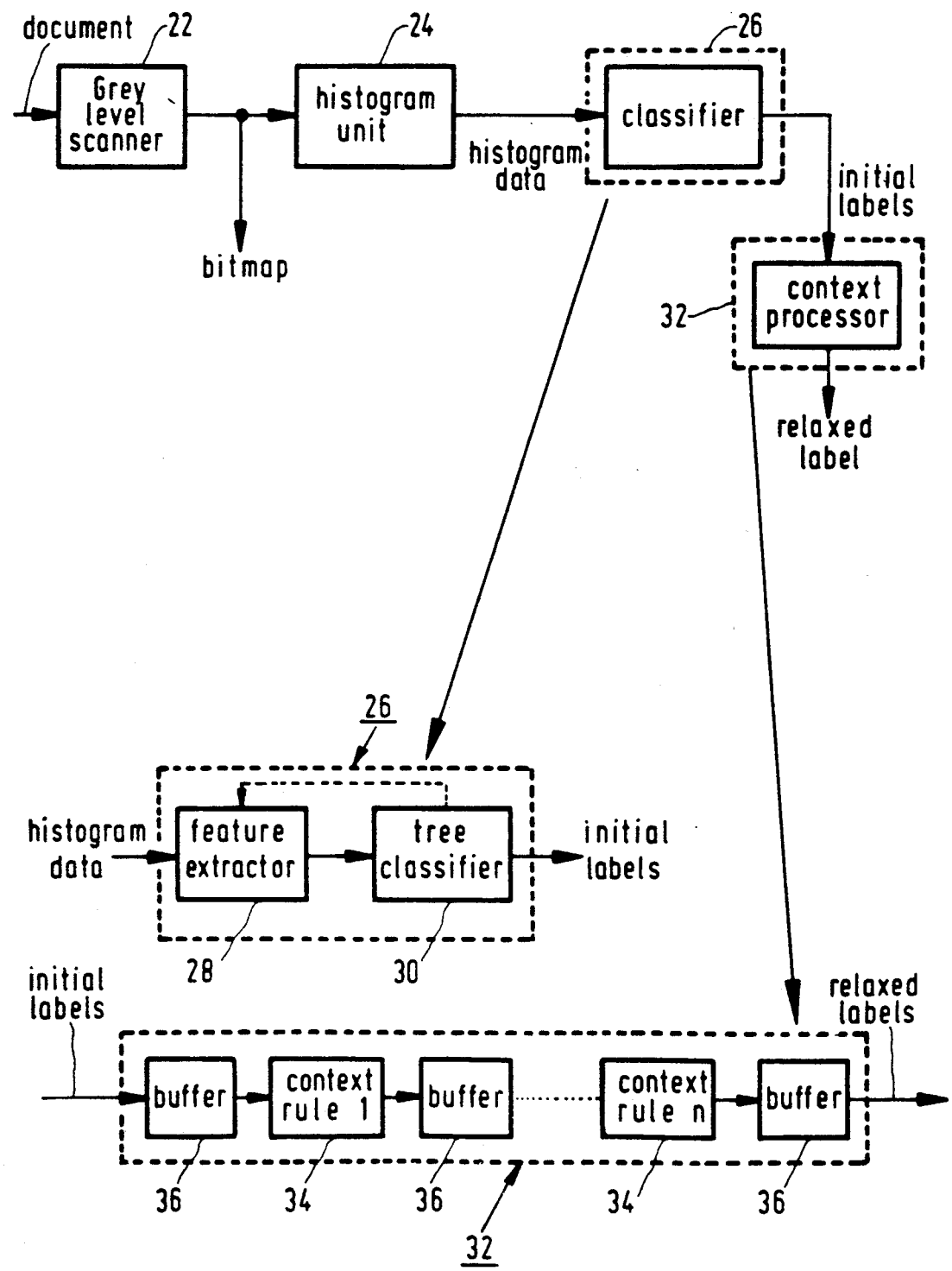
FIG. 5 is a detailed block diagram of a possible implementation of the system according to the present invention.

FIG. 5 is a block-level hardware diagram of an embodiment of the automatic segmentation system of the present invention. The document is scanned by a scanner 22, and the digital values representing the grey levels of the individual pixels are stored in a bitmap. These values are also transmitted to a histogram unit 24 which establishes histograms for the individual subimages of the document. The histogram data are evaluated in a classifier 26 which corresponds to the initial labeling module 10 shown in FIG. 1. The classifier 26 consists of a feature extractor 28 for checking the features of the histogram and a tree-classifier 30 which selects the features to be checked and finally assigns one of the initial labels to the investigated subimage.

The initial labels are further processed in a context processor 32 which corresponds to the relaxation module 12 shown in FIG. 1. The context processor comprises processing modules 34 for sequentially applying the context rules (steps (1) through (10)) and buffers 36 for storing the initial label matrix, the intermediate results and the relaxed label matrix. A modified hardware implementation may have a plurality of histogram units 24 and classifiers 26 so that a plurality of subimages can be processed in parallel in the initial labeling phase.

In the embodiment illustrated in FIGS. 1-4, the segmentation system distinguishes only between two different types of information, i.e., black/white information (label T) and continuous tone information (label P). In such a system, the photographic segments may contain periodic information such as raster or dithered images as well as continuous tone information. Nevertheless, the present invention is also applicable to segmentation systems which further distinguish between continuous tone information and periodic information. For example, this can be achieved by modifying the segmentation system such as shown in FIGS. 6 or 7.

Figure 6:
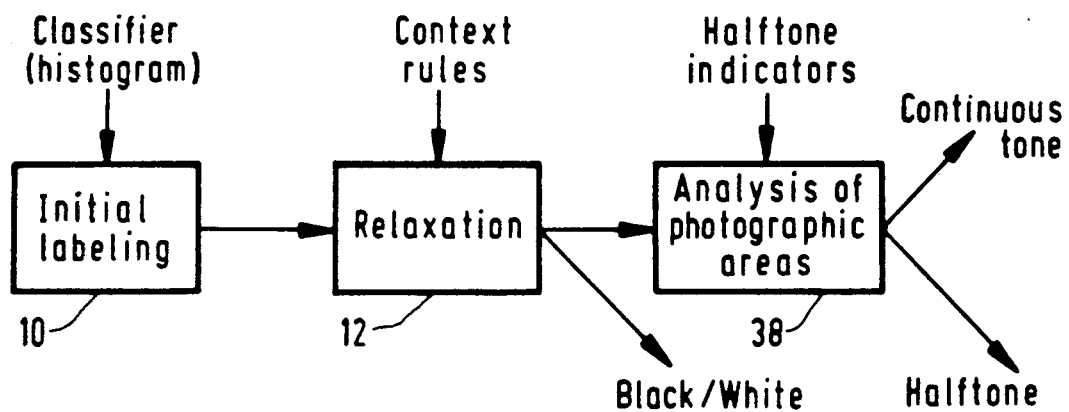
FIGS. 6 and 7 are block diagrams of modified examples of the automatic segmentation system.
Figure 7:
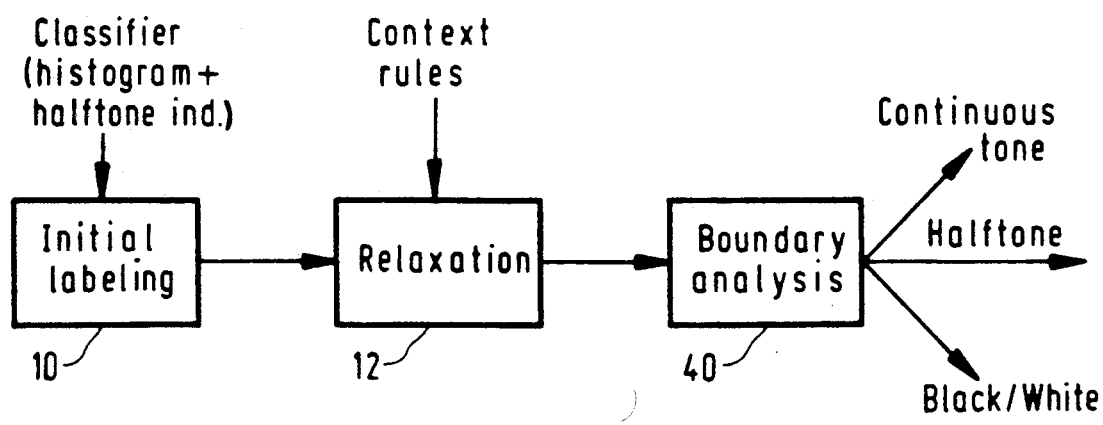

In both FIGS. 6 and 7, half-tone indicators are used to detect half-tone information. Half-tone information can be detected using the following criteria for each subimage (i) the distance between the first non-DC-peak value in the spectrum and the origin of the spectrum; and (ii) the ratio between the DC-peak value and the first non-DC-peak value in the spectrum.

In FIG. 6, the initial labeling process and the relaxation process are performed in the same way as in FIG. 1, but after that, the photographic areas (subimages with label P) are further analyzed to distinguish between continuous tone information and periodic information. This can be done by using one of the raster criteria as applied by the periodicity module 38. The system illustrated in FIG. 6 has the advantage that the time-consuming check for periodic information is confined to the segments that have been identified as photographic area.

Alternatively, the check for periodic information may be carried out in the initial labeling phase, as is illustrated in FIG. 7. In this case, the initial labels include at least one label which indicates a strong candidate for raster images, and the context rules in the relaxation module include rules for expanding this label, so that the relaxed label matrix has three different labels corresponding to continuous tone information, half-tone information, and text and line drawing information.

The context rules to find regions containing half-tone information can be similar to the described context rules FILL and EXPAND of FIG. 3 intended for finding continuous tone areas. Instead of using the target label U, a label indicating half-tone information is used.

In the example shown in FIG. 7, a boundary analysis module 40 is added to improve the congruence between the segments (P and T in FIG. 4B) and the actual borders 20 of the photographic areas of the document. Boundary analysis may be accomplished by vertically and horizontally shifting the grid of the subimages by a fraction of the subwindow size (e.g., ¼, ½, ¾) and repeating the initial labeling and relaxation procedures for the shifted grids. Then, a comparison of the different results provides more detailed information on the actual position of the boundaries of the photographic area. Optionally, horizontal and vertical boundary analysis may be limited to the portions of the document in which vertical and horizontal boundaries of the photographic area can be expected.

In an alternative approach, boundary analysis may be carried out by further examining certain target areas which are centered on the coordinates of label transitions in the relaxed label matrix. For example, the target areas could be subdivided into subwindows providing a higher resolution than is used during initial labeling, and then each subwindow could be classified as a boundary subwindow or a non-boundary subwindow. The analysis of target areas may be limited to isolated locations on the transition lines in the relaxed label matrix. When the boundary is exactly located within these target areas, the exact position of the whole boundary may be found by extrapolation.

While presently preferred embodiments of the best mode of carrying out the present invention have been shown and described with particularity, the invention may otherwise be embodied within the scope of the appended claims.

What is claimed is:

1. A method for automatically segmenting a scanned document in an electronic document processing device to separate document areas containing different types of image information comprising the steps of:
   (a) scanning the document to generate a scanned image thereof;
   (b) subdividing the scanned image into a matrix of subimages;
   (c) analyzing the information contained in each subimage and assigning to each subimage an initial label selected from a first set of labels to obtain an initial label matrix; and
   (d) relating the initial label matrix by changing the labels of individual matrix subimages into relaxed labels which are selected from a second set of labels, pursuant to a plurality of context rules, which is smaller in number than said first set to obtain a pattern of uniformly labeled segments representing those document areas containing different types of information, said context rules comprising the following:
   (i) if in a predetermined array of subimages in the initial label matrix at least n subimages have the label BW and this array does not contain labels from a group G, then change all labels in this array to BW'', wherein n is a predetermined number, BW is a predetermined initial label and G is a predetermined subset of the first set of labels;
   (ii) "if in a predetermined array of subimages in the initial label matrix at least m subimages have the label U, then change all labels in this array to U, " wherein m is a predetermined number and U is a predetermined initial label; and
   (iii) (1) "where the label U forms intersecting vertical and horizontal runs, fill the whole rectangle spanned by these runs with the label U,
   (2) check all combination of horizontal and vertical runs to maximize the area to be filled with the label U, and
   (3) if the height of the maximized area is smaller than $h_{min}$ elements or the width is smaller than $w_{min}$ elements, then change all labels within this areas to BW," wherein U and BW are predetermined initial labels and $h_{min}$ and $w_{min}$ are predetermined numbers.

2. The method as described in claim 1 wherein the context rules further comprise the following:

"if the rectangle, mentioned in (iii) (1), contains a number of U labels greater than a predetermined number Umin, fill the whole rectangle with label U," and "if the shape of the rectangle, mentioned in (iii)(1), fulfills the conditions: width/height > min. and width/height < max., fill the whole rectangle with label U;"

wherein min. and max. are predetermined numbers.

3. The method as described in claim 2 wherein the predetermined arrays to which the context rules (i) and (ii) are applied have a size of three by three subimages.

4. The method as described in claim 1 wherein the relaxation step further comprise a plurality of steps for step-wise modifying the initial label matrix by applying each context rule at least one time pursuant to a predetermined sequence.

5. The method as described in claim 1 wherein the context rule with the structure as defined in (i) is applied prior to the context rule with the structure as defined in (ii) and the context rule with the structure as defined in (ii) is applied prior to the context rule with the structure as defined in (iii).

6. The method as described in claim 5, wherein the context rules further comprise a LOCAL rule prescribing that:

"if a given matrix element is surrounded by upper, lower, right and left immediate neighbors which all have the same label X, the label of the given matrix subimage is also changed to X" and wherein the LOCAL rule is applied immediately before each of the context rules with the structure as defined in (i), (ii), or (iii).

* * * * *